US008015192B2

(12) United States Patent
Rathod et al.

(10) Patent No.: US 8,015,192 B2
(45) Date of Patent: *Sep. 6, 2011

(54) CLIPRANK: RANKING MEDIA CONTENT USING THEIR RELATIONSHIPS WITH END USERS

(75) Inventors: Priyang Rathod, Mountain View, CA (US); Mithun Sheshagiri, Mountain View, CA (US); Simon J. Gibbs, San Jose, CA (US); Anugeetha Kunjithapatham, Sunnyvale, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 547 days.

This patent is subject to a terminal disclaimer.

(21) Appl. No.: 12/120,209

(22) Filed: May 13, 2008

(65) Prior Publication Data

US 2009/0132519 A1 May 21, 2009

Related U.S. Application Data

(60) Provisional application No. 60/989,413, filed on Nov. 20, 2007.

(51) Int. Cl.
G06F 7/00 (2006.01)
G06F 17/30 (2006.01)
(52) U.S. Cl. .................. 707/748; 707/752; 707/754
(58) Field of Classification Search .............. None
See application file for complete search history.

(56) References Cited

U.S. PATENT DOCUMENTS

| | | | |
|---|---|---|---|
| 2006/0173974 A1* | 8/2006 | Tang | 709/217 |
| 2008/0126303 A1* | 5/2008 | Park et al. | 707/3 |
| 2008/0147649 A1* | 6/2008 | Kim et al. | 707/5 |
| 2008/0243812 A1* | 10/2008 | Chien et al. | 707/5 |

OTHER PUBLICATIONS

U.S. Appl. No. 60/242,139, filed Oct. 23, 2000.
Bharat et al. "Hilltop: A Search Engine based on Expert Documents." 1998.
Brin et al. "The Anatomy of a Large-Scale Hypertextual Web Search Engine." In Ashman and Thislewaite, pp. 107-117. Brisbane, Australia. http://citeseer.ist.psu.edu/brin98anatomy.html.
U.S. Appl. No. 12/120,211, filed May 13, 2008.
Office Action dated Sep. 17, 2010 from U.S. Appl. No. 12/120,211.
Office Action dated Feb. 18, 2011 from U.S. Appl. No. 12/120,211.

* cited by examiner

*Primary Examiner* — Uyen T. Le
(74) *Attorney, Agent, or Firm* — Beyer Law Group LLP

(57) ABSTRACT

A method of ranking pieces of media content is provided. Each of the plurality pieces of media content has at least one relationship with at least one user. Each of the users has at least one relationship with at least one of the pieces of media content. Weights are associated with each piece of media content, user and relationship. The weight of a particular piece of media content is determined by recursively calculating and updating the weights of the pieces of media content and the users. The weight associated with a piece of media content or a user is calculated based on the weights of the at least one relationship and the weights of the at least one piece of media content or the at least one user with which the piece of media content or the user has the at least one relationship.

26 Claims, 8 Drawing Sheets

CLIPRANK: RANKING MEDIA CONTENT USING THEIR RELATIONSHIPS WITH END USERS

CROSS REFERENCE TO RELATED APPLICATION

This patent application takes priority under 35 U.S.C. 119 (e) to U.S. Provisional Patent Application No. 60/989,413, filed on Nov. 20, 2007, entitled "A PERSONALIZED VIDEO RECOMMENDER SYSTEM" by Gibbs et al., which is hereby incorporated by reference in its entirety and for all intents and purposes.

FIELD OF THE INVENTION

The present invention generally relates to systems and methods for ranking media content, especially video content. More specifically, the present invention relates to systems and methods for ranking media content using their relationships with end users and/or with each other.

BACKGROUND OF THE INVENTION

Presently, there is a vast amount of media content, such as audios, videos, or graphics, available from a variety of sources. From digital graphics and music to films or movies to broadcast television programs to cable or satellite television programs to home movies or user-created video clips, there are many repositories and databases from which people may choose and obtain media content in various formats, and the amount of media content available continues to grow at a very high rate. Broadcast, cable, or satellite companies often provide hundreds of different channels for viewers to choose from. Movie rental companies such as Netflix and Blockbuster have tens, even hundreds, of thousands of titles on DVDs (digital video disc) or video cassettes. More recently, the Internet has also lent its unique capability and become a great repository and distribution channel for video media world-wide. Online stores such as Amazon.com have a great number of CDs, DVDs, and downloadable media files for sale. Websites such as YouTube and AOL Video have immense audio and video collections, often millions of audio/video clips, contributed by users from all over the world.

With such a great amount of available media content, often there is the need to rank a selected set of media content. For example, suppose a person is looking for video clips relating to the subject matter of figure skating at YouTube's website. The person searches for the video clips using the keywords "figure skating," and may currently be presented with nearly sixty thousand choices. Obviously, it is impractical and nearly impossible to present all sixty thousand video clips to the person simultaneously. Instead, the video clips are presented in a sequential order, perhaps a few at a time. YouTube may choose to display twenty video clips on each web page and enable the person to examine and/or view as many video clips as he or she chooses by going through multiple web pages. In this case, the nearly sixty thousand video clips need to be ranked first so that they may be presented to the person in sequence. For example, YouTube may rank the video clips according to their relevance to the subject matter of figure skating, e.g. more relevant video clips ranked higher, or according to their posting dates, e.g., newer video clips ranked higher. Other ranking methods include ranking according to popularity, by alphabetical order, etc.

In another similar example, suppose a person wishes to purchase romantic music in MP3 format from Amazon. The person searches for the downloadable music files using the keywords "romance" at Amazon's website, and may currently be presented with nearly nine thousand songs. Again, the nearly nine thousand songs need to be ranked before being presented to the person in a sequential order, and the ranking may be performed according to relevance, best selling, price, average customer review, release date, etc.

In the above examples, although the rankings are performed for specific persons, i.e., the person searching for the video clips or the music files, the method or criteria used to rank the search results often do not take into consideration the person's own preferences or tastes. In addition, the ranking results do not take into consideration the relationships among the various people, i.e. users, and/or media content. Consequently, the resulting orders may not be best suitable for the specific individuals for whom the rankings are performed.

SUMMARY OF THE INVENTION

Broadly speaking, the present invention generally relates to ranking media content using their relationships with end users and/or with each other.

According to various embodiments, method and computer program product for ranking a plurality pieces of media content are provided. Each of the plurality pieces of media content has at least one relationship with at least one of a plurality of users. Each of the plurality of users has at least one relationship with at least one of the plurality pieces of media content. Each of the plurality pieces of media content is associated with a weight, each of the plurality of users is associated with a weight, and each relationship is associated with a weight. For each of the plurality pieces of media content and each of the plurality of users, recursively calculating and updating the weight associated with the piece of media content or the user until a difference between the weights associated with the plurality pieces of media content and the plurality of users calculated during a current iteration and the weights associated with the plurality pieces of media content and the plurality of users calculated during a previous iteration is less than a predefined threshold. The weight associated with a piece of media content or a user is calculated based on the weights of the at least one relationship and the weights of the at least one piece of media content or the at least one user with which the piece of media content or the user has the at least one relationship. Ranking the plurality pieces of media content according to their respectively associated weights.

According to another embodiment, a method of ranking a plurality pieces of media content for a specific user is provided. Each of the plurality pieces of media content has at least one relationship with at least one of a plurality of users. Each of the plurality of users has at least one relationship with at least one of the plurality pieces of media content, wherein the specific user is one of the plurality of users. Each of the plurality pieces of media content is associated with a weight, each of the plurality of users is associated with a weight, and each relationship is associated with a weight. Assign an initial value to the weight associated with each of the plurality pieces of media content, wherein an initial value of a weight associated with a piece of media content is determined based on a content rating associated with the piece of media content obtained for the specific user. For each of the plurality pieces of media content and each of the plurality of users, recursively calculating and updating the weight associated with the piece of media content or the user until the difference between the weights associated with the plurality pieces of media content and the plurality of users calculated during a current iteration and the weights associated with the plurality pieces of media content and the plurality of users calculated during a previous iteration is less than a predefined threshold, wherein the weight associated with a piece of media content or a user is calculated based on the weights of the at least one relationship and the weights of the at least one piece of media content or the at least one user with which the piece of media content or the user has the at least one relationship. Ranking the plurality pieces of media content according to their respectively associated weights.

According to another embodiment, a system for ranking a plurality pieces of media content is provided. Each of the plurality pieces of media content has at least one relationship with at least one of a plurality of users. Each of the plurality of users has at least one relationship with at least one of the plurality pieces of media content, Each of the plurality pieces of media content is associated with a weight, each of the plurality of users is associated with a weight, and each relationship is associated with a weight. The system comprises a relationship graph builder configured to construct and initialize a relationship graph, wherein the relationship graph includes the plurality of pieces of media content, the plurality of users, relationships among the plurality of pieces of media content and the plurality of users, predefined weights associated with the relationships, and initial weights associated with the plurality of pieces of media content and the plurality of users; and a weight calculator configured to calculate the final weights associated with the plurality of pieces of media content and the plurality of users by repeatedly calculating and updating the weights associated with the plurality of pieces of media content and the plurality of users until a difference between the weights calculated during a current iteration and the weights calculated during a previous iteration is less than or equal to a predefined threshold.

These and other features, aspects, and advantages of the invention will be described in more detail below in the detailed description and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
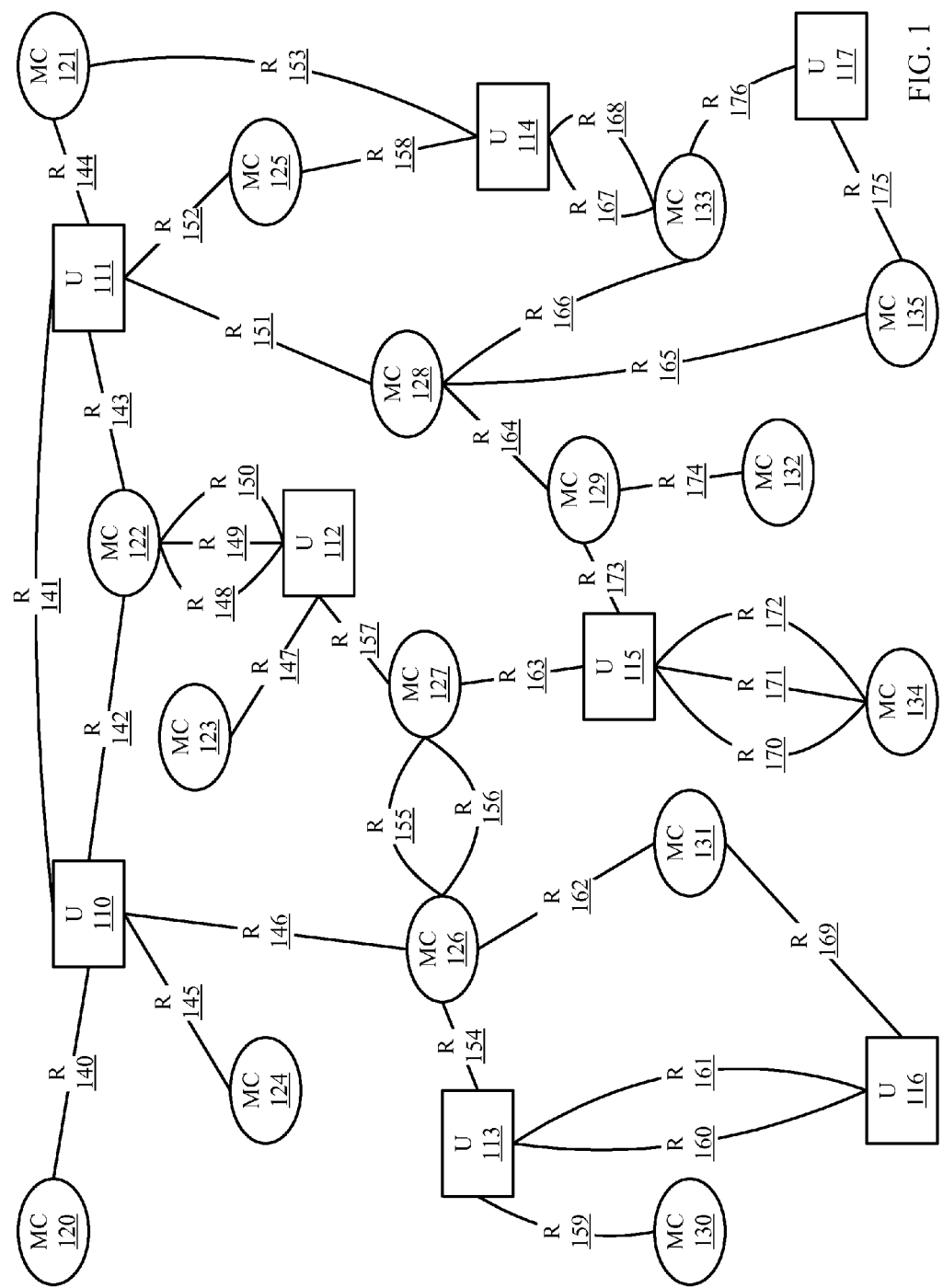
FIG. 1 illustrates a relationship graph between a set of users and a set of media content according to one embodiment of the invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. In addition, while the invention will be described in conjunction with the particular embodiments, it will be understood that this description is not intended to limit the invention to the described embodiments. To the contrary, the description is intended to cover alternatives, modifications, and equivalents as may be included within the spirit and scope of the invention as defined by the appended claims.

According to various embodiments, systems and methods for ranking a set of media content using their relationships with end users are provided. Such ranking is sometimes referred to herein as "ClipRank." The types of media content include, but are not limited to, audio content, video content, and/or graphics content. A relationship may exist between a user and a piece of media content, two users, or two pieces of media content. A piece of media content may be, for example, an audio, a video, or an image. There is no limit on the number of specific relationships a user may have with a piece of media content or another user, and similarly, there is no limit on the number of specific relationships a piece of media content may have with a user or another piece of media content.

The types of relationships may vary greatly, and their definitions depend entirely on the requirements of the specific implementations of the system and the method. For example, between a user and a piece of media content, the types of relationships may include, but not limited to, the user has created the piece of media content, the user has viewed the piece of media content, the user has recorded the piece of media content, the user has downloaded the piece of media content, the user has uploaded the piece of media content, the user has purchased the piece of media content, the user has rented the piece of media content, the user has commented on the piece of media content, the user has manually rated the piece of media content, the user has tagged the piece of media content, the user has recommended the piece of media content to at least one other user, the user has marked the piece of media content as his or her favorite, and the user is the owner of the piece of media content. Between two users, the types of relationships may include, but are not limited to: (a) the first user and the second user both belong to the same social group, (b) the first user has marked the second user as a friend, and (c) the first user has subscribed to the second user. Between two pieces of media content, the types of relationships may include, but are not limited to: (d) the first piece of media content and the second piece of media content are related, and (e) the first piece of media content and the second piece of media content both belong to the same program series.

Each relationship between a user and a piece of media content, between two users, and between two pieces of media content is assigned a weight. Usually, although not necessarily, relationships of the same type are assigned the same weight and the weight for each type of relationships is predefined. Furthermore, relatively more important types of relationships are assigned higher weights than relatively less important types of relationships. Again, what is considered a more or less type of relationships depends entirely on the requirements of the specific implementations of the system and the method. In addition, the users and the pieces of media content each has an initial weight.

The weights of the relationships between the users and/or the pieces of media content are used to calculate the final weights for the users and the pieces of media content, and the final weights are used to rank the users and/or the pieces of media content. Thus, the weights of the users and the pieces of media content may be referred to as "ClipRank values." By using the weights of the relationships between the users and/or the pieces of media content to calculate the final weights for the users and the pieces of media content, which are then used to rank the users and/or the pieces of media content, the ranking results of the users and/or the pieces of media content reflect the social relationships among the users and the pieces of media content.

The relationships between the users and the pieces of media content may be represented using a relationship graph. FIG. 1 illustrates a relationship graph between a set of users and a set of media content according to one embodiment. For easy visual distinction, in FIG. 1, each user, denoted by "U", is represented by a rectangular node and each piece of media content, denoted by "MC", is represented by an oval node. However, when calculating their respective weights, the users and the pieces of media content are treated exactly the same, and no distinction is made between a user and a piece of media content for the weight calculation purpose. Each relationship, denoted by "R", between a user, i.e., a rectangular node, and a piece of media content, i.e., an oval node, or between two users or between two pieces of media content is represented by a line, i.e., an edge, connecting the two appropriate nodes. Sometimes, the same user and piece of media content or the same two users or the same two pieces of media content may have multiple relationships of the same or different types. In this case, each specific relationship is represented by a separate line connecting the same two appropriate nodes.

Using the relationship graph shown in FIG. 1 as an example, there are three lines, R 148, R 149, and R 150, connecting the node U 112 and the node MC 122, suggesting that there are three separate relationships between user 112 and media content 122, e.g., a video file. The three relationships, R 148, R 149, and R 150, may be of the same type or may be of different types. For example, R 148 may represent a relationship where user 112 has viewed media content 122; R 149 may represent a relationship where user 112 has commented on media content 122; and R 150 may represent a relationship where user 122 has recommended media content 122 to another user.

There are two lines, R 167 and R 168, connecting the node U 114 and the node MC 133, e.g., an audio file. Again, these two lines may represent two relationships of the same type or of different types. For example, if user 114 has listened to media content 133 twice, R 167 and R 168 may each represents the relationship where user 114 has listened to media content 133 once.

There are two lines, R 160 and R 161, connecting the node U 113 and the node U 116. R 160 may represent a relationship where user 113 considers user 116 as a friend. R 161 may represent a relationship where user 116 has subscribed to user 113.

There is one line, R 162, connecting the node MC 126 and the node MC 131, which may represent a relationship where media content 126 and media content 131 both belong to the same program series.

Thus, in the relationship graph, every user and every piece of media content is represented by a node, and every relationship between a user and a piece of media content or between two users or between two pieces of media content is represented by an edge connecting the two appropriate nodes. If multiple relationships exist between a user and a piece of media content or between two users or between two pieces of media content, then multiple edges connect the two appropriate nodes, with each edge representing a specific relationship. There is no limit on the number of relationships, i.e., the number of edges, a user or a piece of media content may have, and there is no limit on the number of types of relationships that may exist between a user and a piece of media content or between two users or between two pieces of media content.

As indicated above, each user and each piece of media content may be associated with a weight, denoted by "W(mc_u)", and each relationship between a user and a piece of media content or between two users or between two pieces of media content may be associated with a weight, denoted by "W(r)". The weights associated with the relationships may be used to calculate the weights of the users and the pieces of media content. The weights of the users and/or the pieces of media content may be used to rank the users and/or the pieces of media content.

General ClipRank

According to one embodiment, the weights associated with the relationships connected to a particular media content or user are used to calculate the final weights associated with that media content or user.

Figure 2:
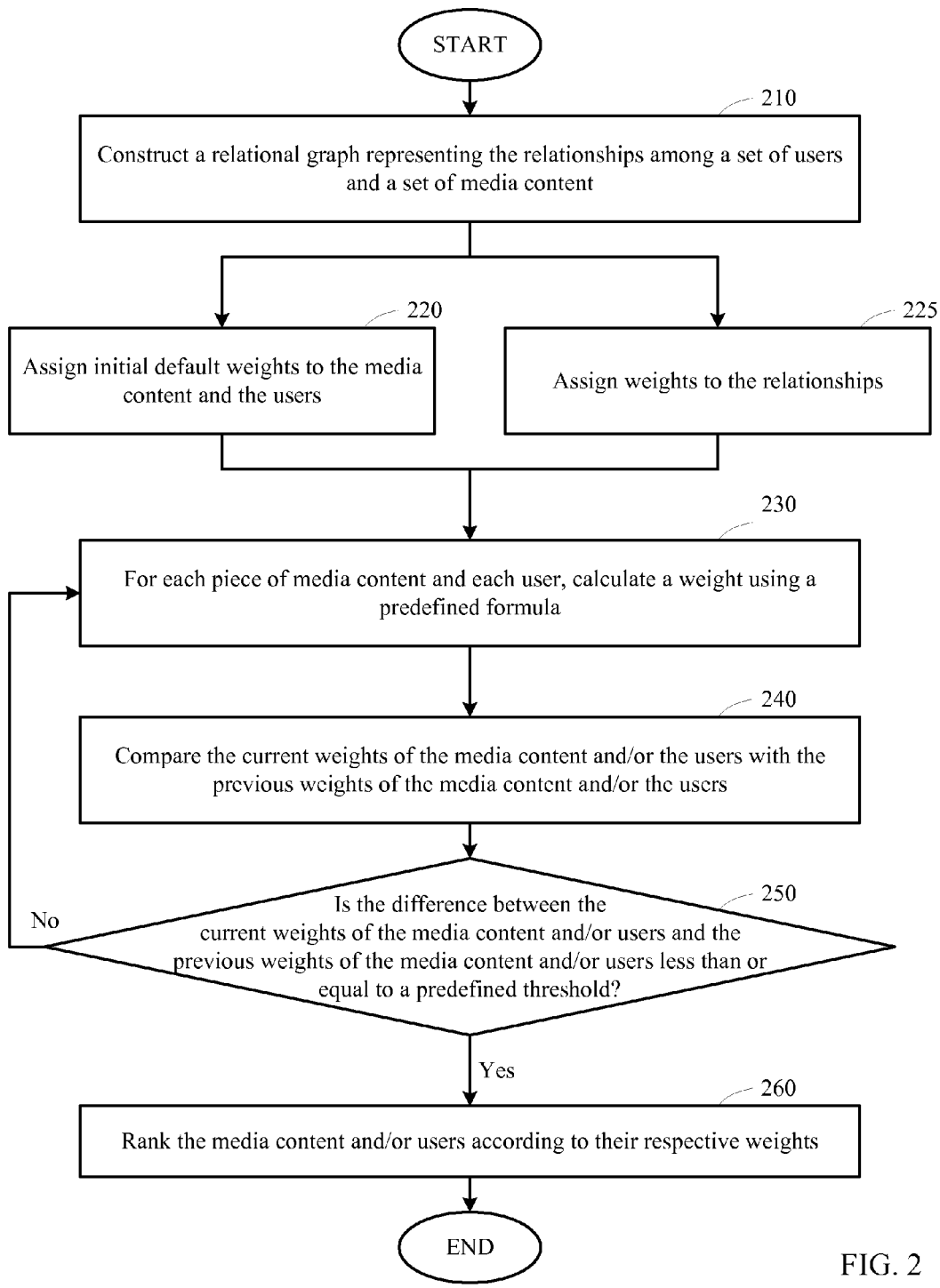
FIG. 2 shows a method of ranking the media content using their relationships with the users according to one embodiment of the invention.

FIG. 2 shows a method of ranking the media content using their relationships with the users according to one embodiment. A relationship graph, such as the one shown in FIG. 1, is constructed for a set of users and a set of media content (step 210). The relationship graph includes the relationships among the users and/or the media content. The information or data used to contract such a relationship graph may be obtained from various sources. For example, websites often monitor and record user actions performed at their sites. The recorded user actions may be stored in database(s) for future analysis. Thus, the stored data may be parsed to determine specific relationships among individual users and pieces of media content. More specifically, suppose a user views a video clip at a website, and the application server hosting the website monitors the viewing action from the user and records the related information in a database. Subsequently, the recorded data may be parsed to determine the identities of the user and the video clip, and the action the user has performed, i.e., viewing, with respect to the video clip. This information may then be incorporated into the relationship graph to establish a viewing relationship between the user and the video clip. Similarly, suppose a first user subscribes to a second user, e.g., the first user subscribing to the media content posted by the second user, at a website, and the subscription is recorded by the application server hosting the website. Subsequently, the recorded data may be parsed to determine the identities of the two users, and that one user has subscribed to another user. This information may then be incorporated into the relationship graph to establish a subscription relationship between the two users.

Once a relationship graph has been constructed, a default initial weight is assigned to each user and each piece of media content (step 220), and a pre-defined weight is assigned to each relationship among the users and the pieces of media content (step 225). Different systems may be used to represent the weight values associated with the users, the media content, and the relationships. According to some embodiments, a numerical system with a specific range is used. Any numerical system and any range may be selected. For example, the weight values may be integers between 1 to 5, 1 to 10, 1 to 100, etc.

Sometimes, certain relationships are considered more important than others. What relationship(s) is/are considered more or less important depends entirely on the specific requirements of a particular implementation of the system and method. Relationships that are considered important to one implementation may or may not be considered important to another implementation. Usually, although not necessarily, a relatively more important relationship is associated with a higher weight value than a relatively less important relationship. In addition, usually, although not necessarily, relationships of the same type are assigned the same weight value. The following Table 1 shows one example of the weight values associated with some relationships. The weight values are integers range from 1 to 5, and the importance of the relationships is determined based on one particular implementation.

TABLE 1

Sample Weights Associated with Relationships

| Relationship | Weight Value |
| --- | --- |
| Relationships between a user (denoted by "U") and a piece of media content (denoted by "MC") | |
| U created MC | 2 |
| U viewed MC | 3 |
| U recorded MC | 4 |
| U downloaded MC | 3 |
| U uploaded MC | 4 |
| U purchased MC | 5 |
| U rented MC | 3 |
| U commented on MC | 1 |
| U manually rated MC | 1 |
| U tagged MC | 1 |
| U recommended MC | 2 |
| U marked MC as favorite | 3 |
| U owned MC | 5 |
| Relationships between two users (denoted by "U1" and "U2") | |
| U1 and U2 belong to same group | 1 |
| U1 subscribed to U2 | 3 |
| U1 marked U2 as friend | 2 |
| Relationships between two pieces of media content (denoted by "MC1" and "MC2") | |
| MC1 related to MC2 | 2 |
| MC1 and MC2 belong to same series | 1 |

Using the sample weights shown in Table 1, for example, each relationship in FIG. 1 would be assigned a weight value between 1 and 5. In addition, each user and each piece of media content in FIG. 1 is assigned an initial default weight value. For example, the initial default weight value for the user and media content may be 1.

The weights associated with the relationships are used to calculate the final weights associated with the users and pieces of media content. For each piece of media content and each user, calculate a new weight value using a predefined formula that incorporates the weights associated with the relationships connected with that piece of media content or user (step 230). The formula may be chosen based on the requirements of the specific implementations of the system and method. According to one embodiment, the weight associated with a piece of media content or a user may be calculated using the following equation:

$$W(mc\_u) = \sum_{i=1}^{i=n} (W_i(r) * W_i(mc\_u));  \quad (1)$$

where W(mc_u) denotes the weight associated with the piece of media content or the user for which the weight is calculated, n denotes the total number of relationships the piece of media content or the user has with other pieces of media content or other users, $W_i(r)$ denotes the weight associated with a relationship, relationship i, the piece of media content or the user has with another piece of media content or another user, and $W_i(mc\_u)$ denotes the weight associated with the corresponding other piece of media content, media content i, or the corresponding other user, user i, having the relationship, relationship i, with the piece of media content or the user.

Applying the above equation (1) to some of the nodes shown in FIG. 1 to further illustrates its usage, for example, the node representing media content 131, MC 131, has two relationships, R 162 and R 169. R 162 is connected to the node representing media content 126, MC 126; and R 169 is connected to the node representing user 116, U 116. Thus, applying equation (1) to calculate the weight value for MC 131, $$W(MC\ 131)=W(R\ 162)*W(MC\ 126)+W(R\ 169)*W(U\ 116).$$

The node representing user 115, U 115, has five relationships, R 163, R 170, R 171, R 172, and R 173. R 163 is connected to the node representing media content 127, MC 127; R 170, R 171, and R 172 are all connected to the node representing media content 134, MC 134; and R 173 is connected to the node representing media content 129, MC 129. Applying equation (1) to calculate the weight value for U 115, $$W(U\ 115)=W(R\ 163)*W(MC\ 127)+W(R\ 170)*W(MC\ 134)+W(R\ 171)*W(MC\ 134)+W(R\ 172)*W(MC\ 134)+W(R\ 173)*W(MC\ 129).$$

The node representing media content 120, MC 120, only has one relationship, R 140, which is connected to the node representing user 110, U 110. Applying equation (1) to calculate the weight value of MC 120, $$W(MC\ 120)=W(R\ 140)*W(U\ 110).$$

Thus, by repeatedly applying the above equation (1) for each user and each piece of media content in the relationship graph, the weight values associated with each user and each piece of media content may be calculated. Note that by incorporating the weights associated with the relationships connected with a particular user or piece of media content, the weight value calculated for that user or piece of media content using equation (1) takes into consideration the social relationships among the users and pieces of media content.

Once the values of all the weights associated with the users and the pieces of media content have been calculated, the weight values of the users and the pieces of media content calculated during the current iteration, i.e., the current weight values, are compared with the weight values of the users and the pieces of media content calculated during the previous iteration, i.e., the previous weight values (step 240). If the difference between the current weight values and the previous weight values is less than or equal to a predefined threshold (step 250), then the weight calculation stops, and the current weight values are the final weight values for the users and the pieces of media content. Otherwise, a new iteration is repeated, such as a new set of weight values for the users and the pieces of media content are calculated (step 230).

There are a variety of different ways to determine the difference between the weight values calculated during the current iteration and the weight values calculated during the previous iteration. According to one embodiment, the two sums of all the weight values calculated during the two consecutive iterations may be compared. In other words, the difference between the sum of all the weight values calculated during the current iteration and the sum of all the weight values calculated during the previous iteration is compared against a predefined threshold to determine whether the weight calculation process should stop. The difference between the two sums may be calculated using the following equation:

$$\text{difference} = \sum_{i=1}^{i=n} W_{i,j}(\text{mc\_u}) - \sum_{i=1}^{i=n} W_{i,(j-1)}(\text{mc\_u}), \quad (2)$$

where n denotes the total number of the pieces of media content and the users, $W_{i,j}(\text{mc\_u})$ denotes the weight associated a piece of media content, media content i, or a user, user i, calculated during the current iteration, iteration j, and $W_{i,(j-1)}(\text{mc\_u})$ denotes the weight associated a piece of media content, media content i, or a user, user i, calculated during the previous iteration, iteration j–1. Similarly, the difference between the average of all the weight values calculated during the current iteration and the average of all the weight values calculated during the previous iteration may be compared against a predefined threshold to determine whether the weight calculation process should stop. The difference between the two averages may be calculated using the following equation:

$$\text{difference} = \frac{\sum_{i=1}^{i=n} W_{i,j}(\text{mc\_u})}{n} - \frac{\sum_{i=1}^{i=n} W_{i,(j-1)}(\text{mc\_u})}{n}, \quad (3)$$

where, again, n denotes the total number of the pieces of media content and the users, $W_{i,j}(\text{mc\_u})$ denotes the weight associated a piece of media content, media content i, or a user, user i, calculated during the current iteration, iteration j, and $W_{i,(j-1)}(\text{mc\_u})$ denotes the weight associated a piece of media content, media content i, or a user, user i, calculated during the previous iteration, iteration j–1. The predefined threshold value may vary depending on the actual equation used.

According to another embodiment, instead of considering all the weights together, the difference between the weights calculated for each individual user and each individual piece of media content during the current and previous iteration may be compared separately, and the calculation process stops when each individual difference is less than or equal to a predefine threshold. For example, the threshold value may be defined as 0.1, 0.5, etc. The difference of a weight associated with a particular user or piece of media content calculated during the current iteration and the previous iteration may be calculated using the following equation:

$$\text{difference} = W_{i,j}(\text{mc\_u}) - W_{i,(j-1)}(\text{mc\_u}), \quad (4)$$

where $W_{i,j}(\text{mc\_u})$ denotes the weight associated a piece of media content, media content i, or a user, user i, calculated during the current iteration, iteration j, and $W_{i,(j-1)}(\text{mc\_u})$ denotes the weight associated the same piece of media content, media content i, or the same user, user i, calculated during the previous iteration, iteration j–1.

According to another embodiment, instead of considering all the weights associated with both the users and the media content, only the difference between the weights calculated for the media content or the users calculated during the current and previous iteration is compared against a predefined threshold. For example, the difference between the two sums of the weights associated only with the media content may be calculated using the following equation:

$$\text{difference} = \sum_{i=1}^{i=n} W_{i,j}(mc) - \sum_{i=1}^{i=n} W_{i,(j-1)}(mc), \quad (5)$$

where n denotes the total number of the pieces of media content, $W_{i,j}(mc)$ denotes the weight associated a piece of media content, media content i, calculated during the current iteration, iteration j, and $W_{i,(j-1)}(mc)$ denotes the weight associated a piece of media content, media content i, calculated during the previous iteration, iteration j–1. The difference between the two sums of the weights associated only with the users may be calculated using the following equation:

$$\text{difference} = \sum_{i=1}^{i=n} W_{i,j}(u) - \sum_{i=1}^{i=n} W_{i,(j-1)}(u), \quad (6)$$

where n denotes the total number of the users, $W_{i,j}(u)$ denotes the weight associated a user, user i, calculated during the current iteration, iteration j, and $W_{i,(j-1)}(u)$ denotes the weight associated a user, user i, calculated during the previous iteration, iteration j–1.

Other embodiments may use alternative methods or formulas to determine the difference between the weight values calculated during the two consecutive, i.e., the current and the previous, iterations. Note that between one iteration and another iteration, only the weights associated with the users and the media content change, while the weights associated with the relationships remain the same. The weights calculated for the users and the media content during the previous iteration are used to calculate the weights for the users and the media content during the current iteration. Steps 230, 240, and 250 may be repeated as many times as necessary, until the difference between the weight values calculated during the current iteration and the weight values calculated during the previous iteration is less than or equal to the predefined threshold. The weights calculated during the final iteration are the final weights associated with the users and the media content.

The final weights are then used to rank the media content and/or the users (step 260). For example, a piece of media content with a relatively higher weight value is ranked before a piece of media content with a relatively weight value. If two pieces of media content or two users happen to have the same weight value, then a choice needs to be made as to which piece of media content or user is ranked before the other piece of media content or user. The choice may be arbitrary, or may take into consideration of some additional factors, such as the respective dates, lengths, number of relationships, etc. of the two pieces of media content.

The media content may be ranked separately among themselves, and the users may be ranked separately among themselves. Of course, it is also possible to rank both the media content and the users together.

The ranking result obtained using the method shown in FIG. 2 is not biased toward any individual user. That is, the same ranking order would result regardless of for whom the ranking is performed. Thus, this ranking result is referred to as "general ClipRank."

Personalized ClipRank

Alternatively, the method shown in FIG. 2 may be modified slightly to obtain ranking biased toward a specific user. According to some embodiment, in step 220, instead of assigning a default value as the initial weights for the media content and the users, the initial weights assigned to the media content are determined based on data obtained from the specific user for whom the ranking is performed. The initial weights assigned to the users may still be a default value or may also be determined based on data obtained from the specific user. By doing so, the final ranking result is biased toward that user, which is referred to as "personalized ClipRank." The other steps remain unchanged.

There are a variety of ways to determine initial weight values for the media content using data obtained from a specific user. For example, the user may manually specify an initial weight value for some, or possibly even all, of the pieces of media content in a relationship graph.

Alternatively, the initial weight values for the media content included in a relationship graph may be determined based on collaborative filtering ratings obtained for the specific user with respect to the media content. Combining ClipRank and collaborative filtering is described in more detail in co-pending U.S. patent application Ser. No. 12/120,211, filed on May 13, 2008 (concurrently herewith on the same day as the present application), entitled "COMBINATION OF COLLABORATIVE FILTERING AND CLIPRANK FOR PERSONALIZED RECOMMENDATION" by Németh et al., which is hereby incorporated by reference in its entirety and for all intents and purposes.

Alternatively still, the initial weight values for the media content may be automatically determined based on past actions taken by the specific user in connection with the media content. According to one embodiment, the pieces of media content that have been operated on a multi-media device may be automatically rated based the actions taken by a user of the device in connection with the multi-media content. Suppose the user of the multi-media device is the specific user for whom personalized ClipRank is to be performed, then the ratings obtained for the media content from the user's multi-media device may be used to determine the initial weight values associated with the media content. There may be a direct correlation between the rating of a piece of media content and the initial weight value assigned to the piece of media content, e.g., relatively higher rating corresponding to relatively higher weight and vice versa. Automatically rating media content based on device usage information is described in more detail in co-pending U.S. patent application Ser. No. 12/120,217, filed on May 13, 2008 (concurrently herewith on the same day as the present application), entitled "SYSTEM AND METHOD FOR AUTOMATICALLY RATING VIDEO CONTENT" by Gibbs et al., which is hereby incorporated by reference in its entirety and for all intents and purposes.

Optionally, the initial weights assigned to the users may also be determined based on data obtained from or associated with the specific user with respect to the other users, if such data exists. For example, the specific user may manually specify and assign an initial weight value to each user. Alternatively, users that have relationships with the specific user may be assigned a higher weight than users that do not have any relationship with the specific user. If no data exists to provide initial weights for the users with respect to the specific user, the default weight value may be assigned to all the users.

If the initial weights assigned to the pieces of media content and optionally the users in the relationship graph are determined based on data associated with or obtained from a specific user, then the final ranking result is biased toward that user and personalized for that user.

Updating ClipRank Result

To rank a specific set of media content or a specific set of users using the method shown in FIG. 2, a relationship graph between the media content and the users, such as the one shown in FIG. 1, needs to be constructed. Thereafter, the set of media content or the set of users included in the relationship graph may be ranked based on their final weights. However, new media content and/or new users continuously become available. Thus, the relationship graph needs to be updated from time to time to include new pieces of media content and/or new users. Consequently, new weights need to be calculated and new rankings need to be conducted based on the updated relationship graph.

According to one embodiment, each time the relationship graph is updated, weights for all the users and media content, both old and new, are recalculated using the method shown in FIG. 2. However, this may be time-consuming, especially if the relationship graph includes a very large number of media content and users and relationships. Although the relationship graph shown in FIG. 1 only includes a few dozen nodes and edges representing the users and the media content and their relationships, in practice, a relationship graph often includes hundreds, thousands, hundreds of thousands or millions of users, media content, and relationships. Thus, recalculating the weights for all the users and media content often may not be very efficient, especially if only a few new pieces of media content and users and their relationships are added to the relationship graph.

According to another embodiment, each time the relationship graph is updated, only the weights for the new users and media content are calculated. FIG. 3A-3D illustrate the steps of calculating the weights associated with the new users and media content without having to re-calculate the weights associated with the existing users and media content, which have been calculated previously.

Figure 3A:
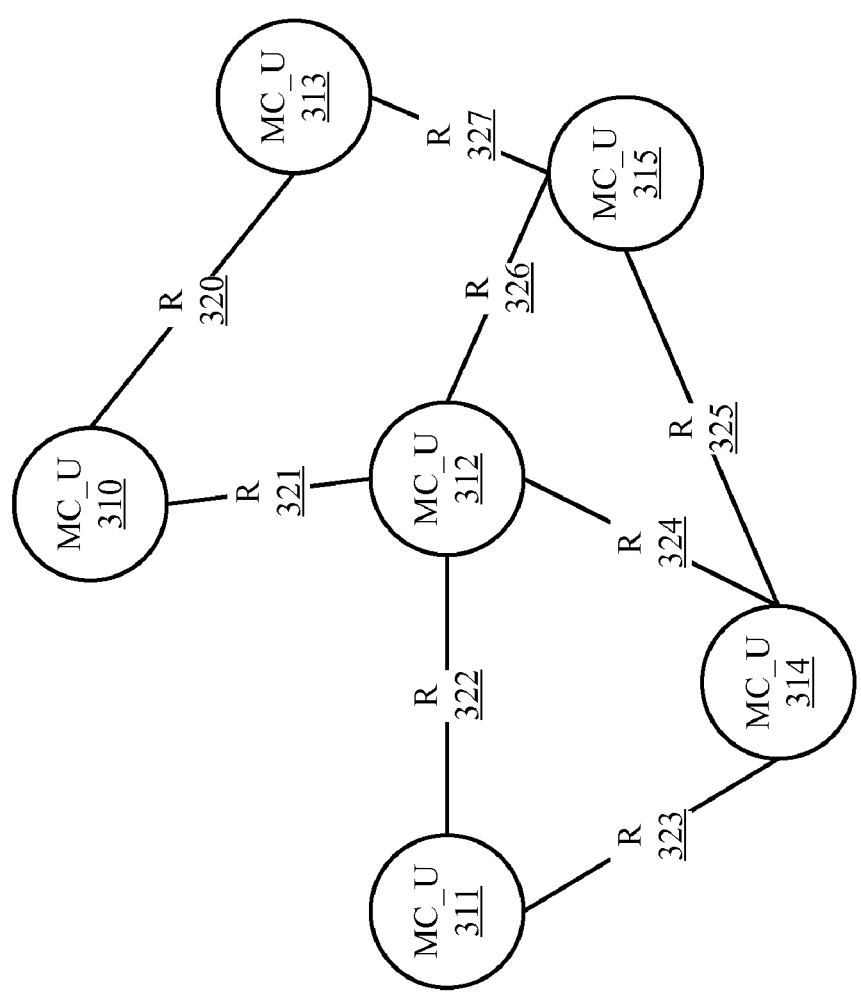
FIG. 3A-3D illustrate the steps of calculating the weights associated with new users and media content added to an existing relationship graph without recalculating the weights associated with users and media content already existed in the relationship graph according to one embodiment of the invention.

FIG. 3A illustrates a sample relationship graph, which includes six nodes, MC_U 310, MC_U 311, MC_U 312, MC_U 313, MC_U 314, and MC_U 315, and eight edges, R 320, R 321, R 322, R 323, R 324, R 325, R 326, and R 327 connecting the various nodes. Each node represents a user or a piece of media content, and each edge represents a relationship between a user and a piece of media content or between two users or between two pieces of media content represented by the corresponding two nodes. To simplify the discussion, FIG. 3A only includes a small number of users, media content, and relationships, but in practice, such a relationship graph often includes a much greater number of users, media content, and relationships.

Figure 3B:
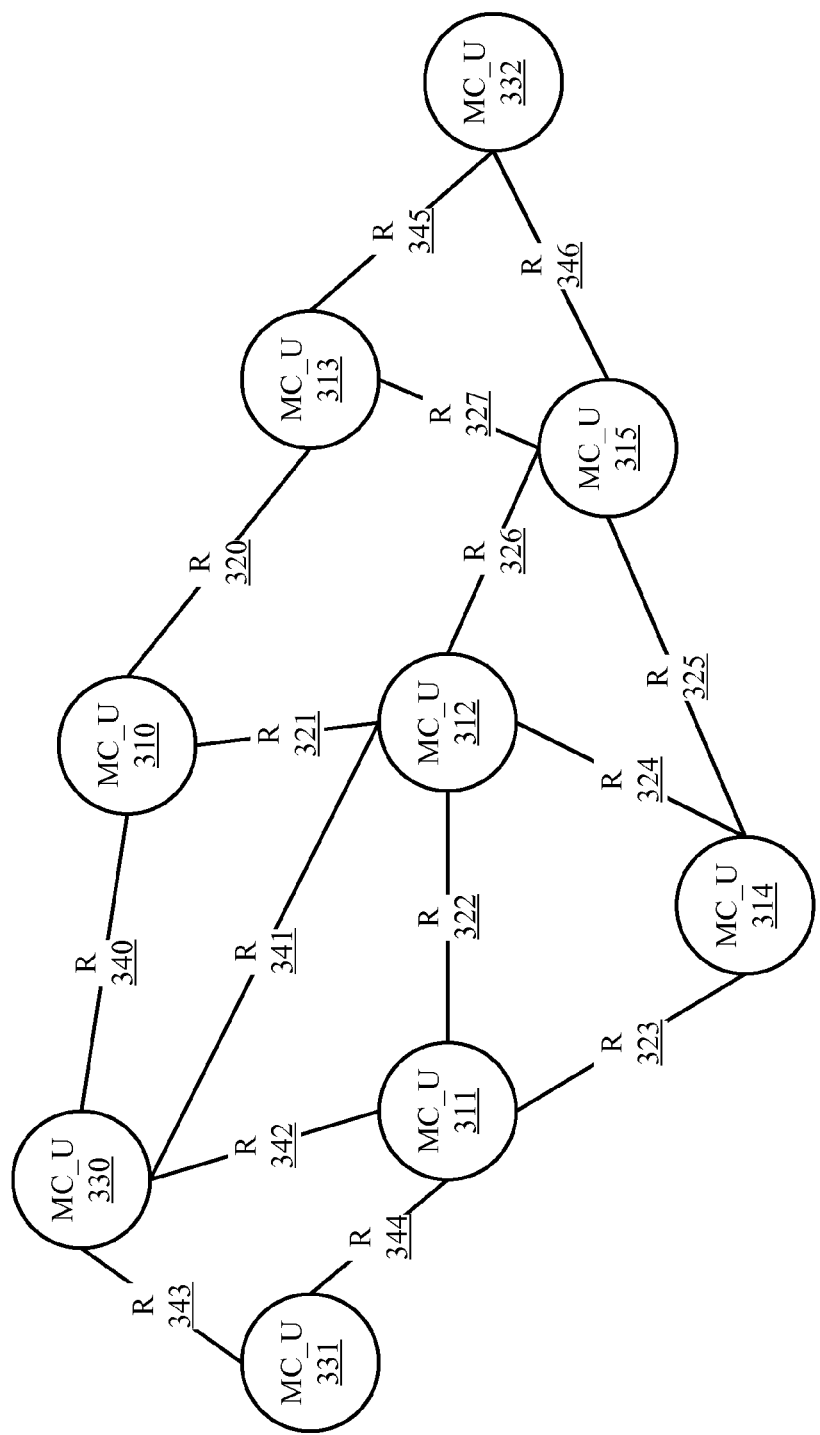

Suppose the weights of the nodes in FIG. 3A have been calculated using the method shown in FIG. 2. Subsequently, new users, media content, and/or relationships become available and need to be added to the relationship graph. In FIG. 3B, three new nodes, MC_U 330, MC_U 331, and MC_U 332 are added to the relationship graph shown in FIG. 3A, each node representing a user or a piece of media content. These new nodes have relationships, represented by the edges, either with some of the existing nodes or among themselves. For example, node MC_U 332 has two relationships, R 345 and R 346, with nodes MC_U 313 and MC_U 315 respectively, both being nodes already existed in the previous version of the relationship graph shown in FIG. 3A. Node MC_U 331 has two relationships, R 343 and R 344. Edge R 343 is connected with node MC_U 330, which is a new node added to the current version of the relationship graph, and edge R 344 is connected to node MC_U 311, which is a node already existed in the previous version of the relationship graph. Node MC_U 330 has four relationships, each represented by an edge. Edges R 340, R 341, and R 342 are connected with nodes MC_U 310, MC_U 312, and MC_U 311 respectively, all of which being nodes already existed in the previous version of the relationship graph. Edge R 343 is connected with node MC_U 331, which is a new node added to the current version of the relationship graph.

Figure 3C:
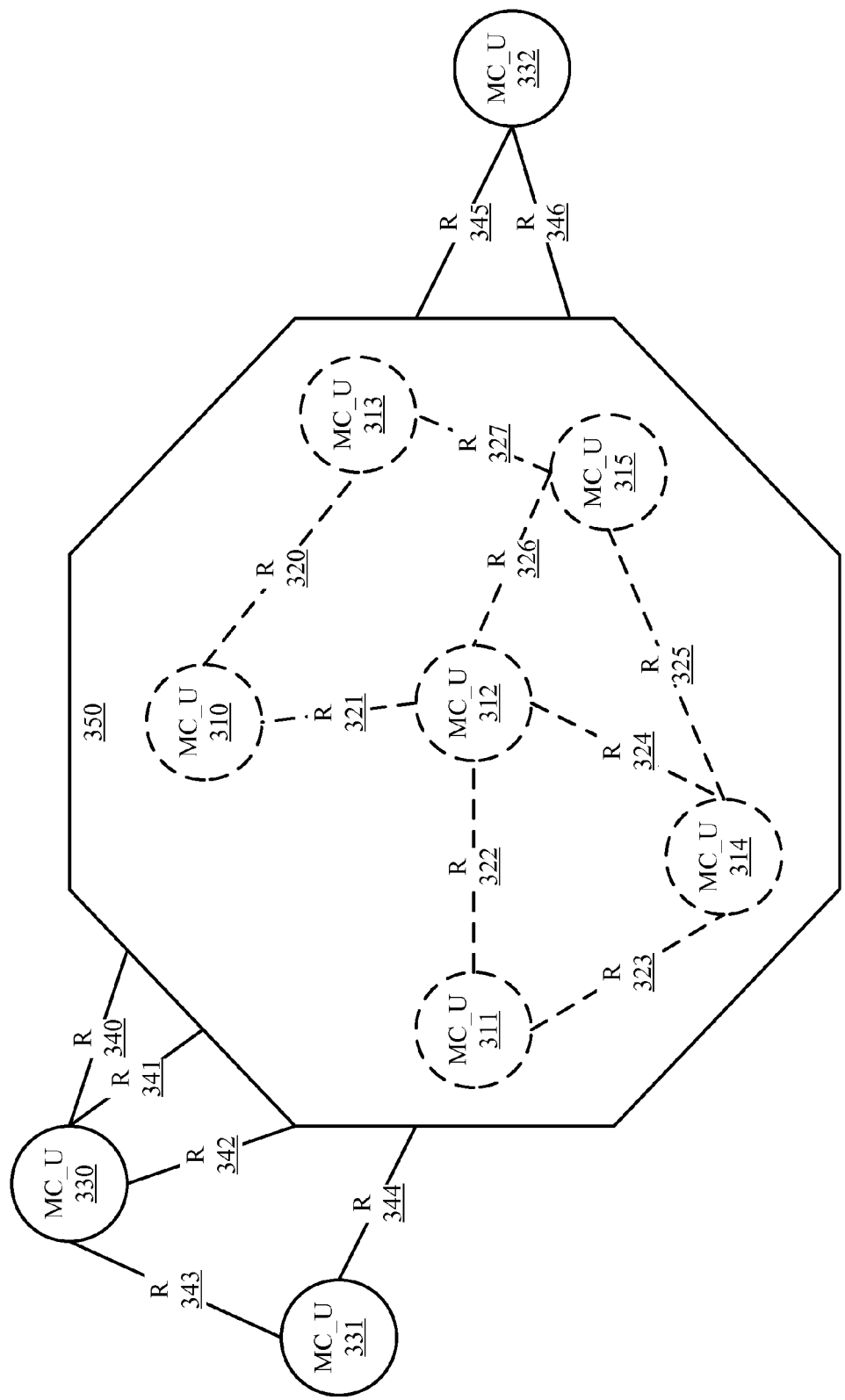

To calculate the weights associated the new nodes MC_U 330, MC_U 331, and MC_U 332 without recalculating the weights associated with the existing nodes whose weights have already been calculated, the older part of the relationship graph may be combined and collapsed into a single node. FIG. 3C illustrates collapsing the nodes and edges from the previous version of the relationship graph shown in FIG. 3A into a single combined node 350. Combined node 350 encompasses nodes MC_U 310, MC_U 311, MC_U 312, MC_U 313, MC_U 314, and MC_U 315, and edges R 320, R 321, R 322, R 323, R 324, R 325, R 326, and R 327. The weight of combined node 350 may be the average weights of the nodes included therein. In the example shown in FIG. 3C, the weight of combined node 350 equals $$(W(MC\_U\ 310)+W(MC\_U\ 311)+W(MC\_U\ 312)+W(MC\_U\ 313)+W(MC\_U\ 314)+W(MC\_U\ 315))/6.$$

In addition, if any of the new nodes, e.g., MC_U 330, MC_U 331, or MC_U 332, have any relationships with any of the existing nodes included in combined node 350, then the relationships are now connected with combined node 350. Thus, edges R 340, R 341, R 342, R 344, R 345, and R 346 are now connected with combined node 350.

Figure 3D:
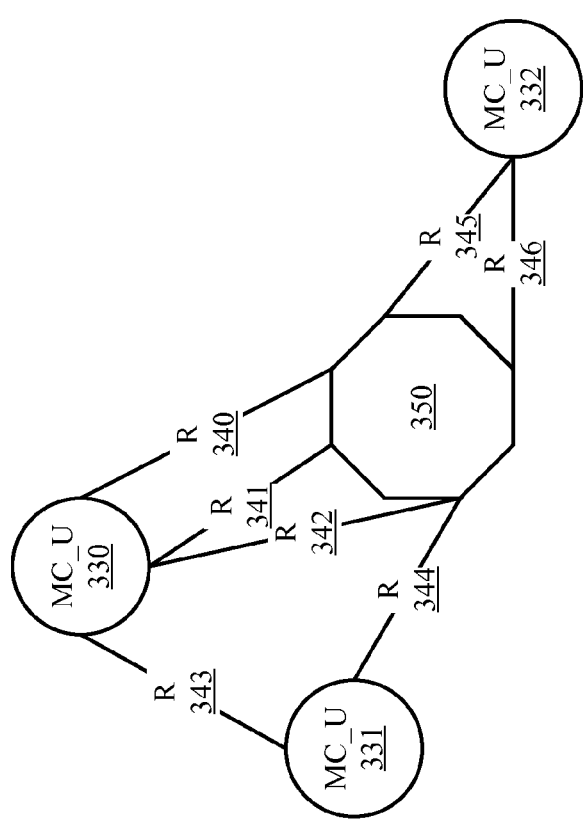

Hereafter, the weights of the new nodes MC_U 330, MC_U 331, and MC_U 332 may be calculated using the method shown in FIG. 2, with combined node 350 behaving like a single node. FIG. 3D shows the relationship graph that may be used to calculate the weights of the new nodes MC_U 330, MC_U 331, and MC_U 332. Again, each of the new nodes MC_U 330, MC_U 331, and MC_U 332 is assigned a default initial weight for calculating general ClipRank weights (step 220) or a default weight determined based on data associated with a specific user for calculating personalized ClipRank weights tailored to that user. Each of the relationship edges 340, R 341, R 342, R 344, R 345, and R 346 is assigned a predefined weight (step 225). Then, the weights of the nodes MC_U 330, MC_U 331, and MC_U 332 are repeated calculated under the difference between the weights calculated during the current iteration and the weights calculated during the previous iteration is less than or equal to a predefine threshold (steps 230, 240, 250).

Note that according to various embodiments, the weight associated with combined node 350 may be recalculated and updated, in which case it is calculated in the same manner as for the other nodes, or may remain unchanged, in which case no new weight value is calculated for combined node 350, throughout the weight calculation process. Finally, the resulting weights of the nodes may be used to rank the nodes (step 260).

ClipRank System Architecture

The ClipRank system and method may be implemented as computer program product(s) having a set of computer program instructions. The computer program instructions with which embodiments of the invention are implemented may be stored in any type of computer-readable media, and may be executed according to a variety of computing models including, for example, on a consumer electronic device, on a stand-alone computing device, or according to a distributed computing model in which various of the functionalities described herein may be effected or employed at different locations.

Figure 4:
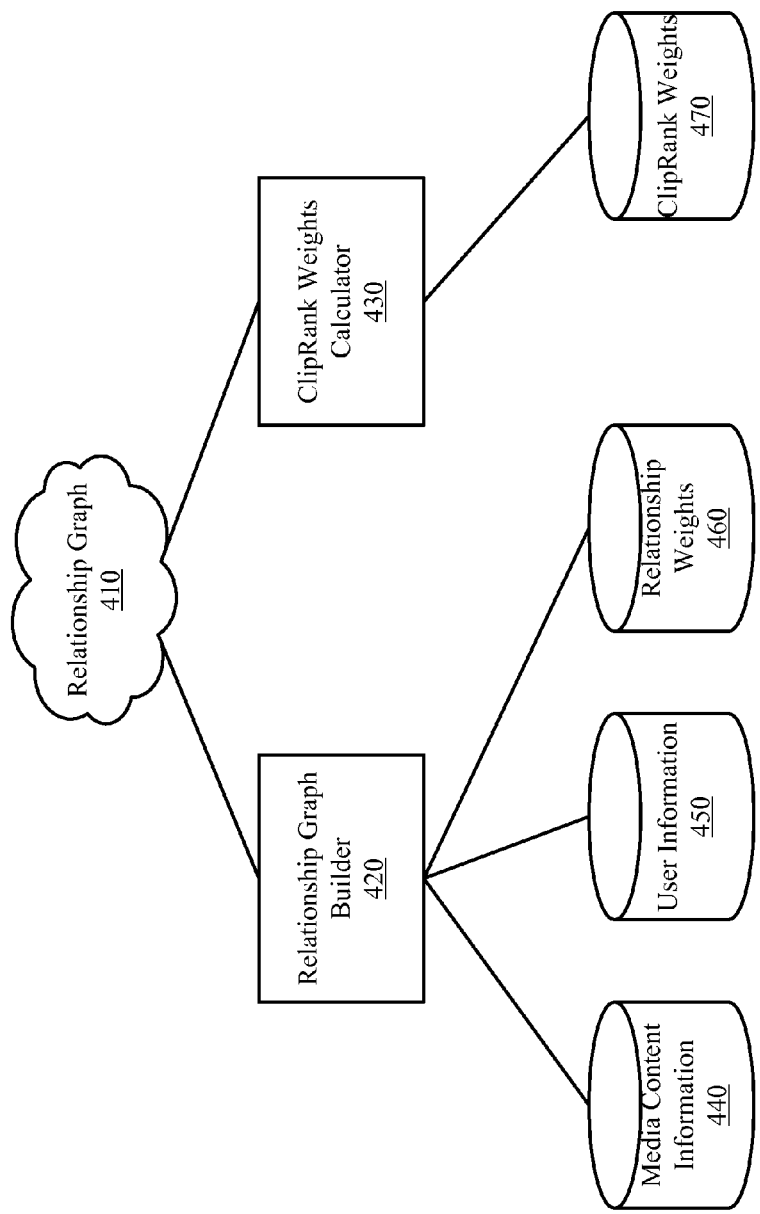
FIG. 4 is a simplified diagram illustrating a system of ranking media content using their relationships with end users according to one embodiment of the invention.

FIG. 4 is a simplified diagram illustrating a system of ranking media content using their relationships with end users according to one embodiment of the invention. One or more databases may be used to store information relating to the media content, the users, and actions the users have taken with respect to the media content and other users that may be used to determine the relationships among the users and the media content. Such information may be obtained from various sources, such as the metadata associated with the media content and users or log files recording user actions. For example, in FIG. 4, database 440 stores information associated with the media content and database 450 stores information associated with the users. The relationship graph builder 420 uses information stored in one or more databases, e.g. media content information 440 and user information 450, to construct the relationship graph 410. Another database 450 may be used to store predefined weights for various types of relationships, and the relationship graph builder 420 uses assign these predefined weights to the appropriate edges representing the various relationships in the relationship graph 410. In addition, the relationship graph builder 420 may assign general or personalized initial weights to the nodes representing the users and the media content in the relationship graph 410.

Once the relationship graph 410 has been constructed, the ClipRank weights calculator 430 calculate the final weights of the users and method content in the relationship graph 410 and stores the weights in database 470.

ClipRank may be used to rank a set of media content and/or users in a variety of applications, especially where it is desirable for the ranking results to take into consideration the relationships among the media content and the users. One particular application of ClipRank is for recommending personalized video content to users of consumer electronic devices or portable media players. Systems and methods for providing personalized video content are described in more detail in co-pending U.S. patent application Ser. No. 12/120, 203, filed on May 13, 2008 (concurrently herewith on the same day as the present application), entitled "A PERSONALIZED VIDEO SYSTEM" by Gibbs et al., which is hereby incorporated by reference in its entirety and for all intents and purposes.

To summarize, a set of video content is automatically selected for user(s) of a consumer electronic device or portable media player based on usage information with respect to operating video content on the device or player. ClipRank may then be used to rank the set of video content before they are presented to the device user(s), such that video content with higher weights, i.e., higher ClipRank rankings, is presented to the user(s) before video content with lower weights, i.e., lower ClipRank rankings. Furthermore, personalized ClipRank weights may be calculated for each individual user or device so that different ranking results are obtained for different users or devices, thus achieving personalized ranking results.

Figure 5A:
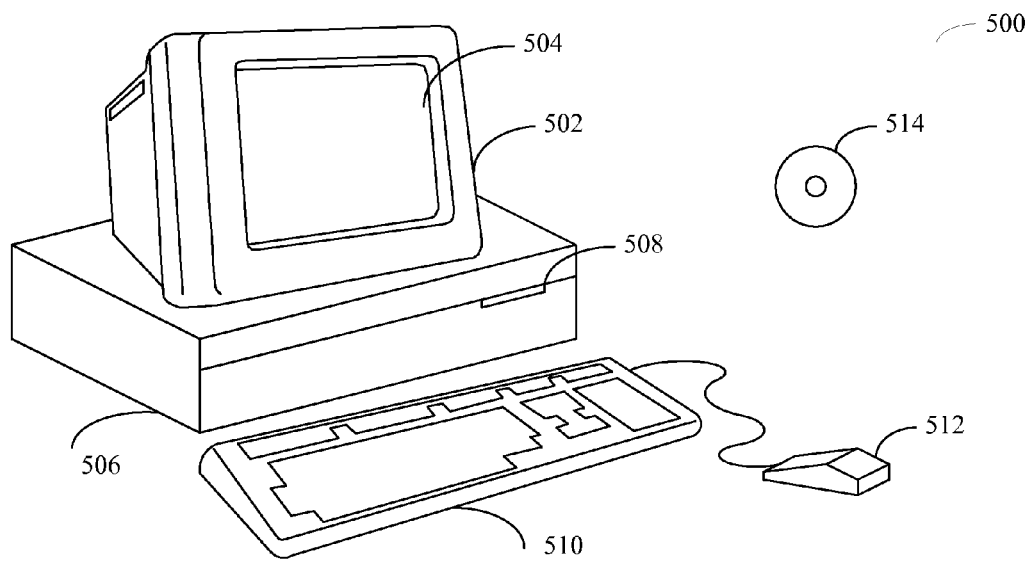
FIGS. 5A and 5B illustrate a computer system suitable for implementing embodiments of the present invention.
Figure 5B:
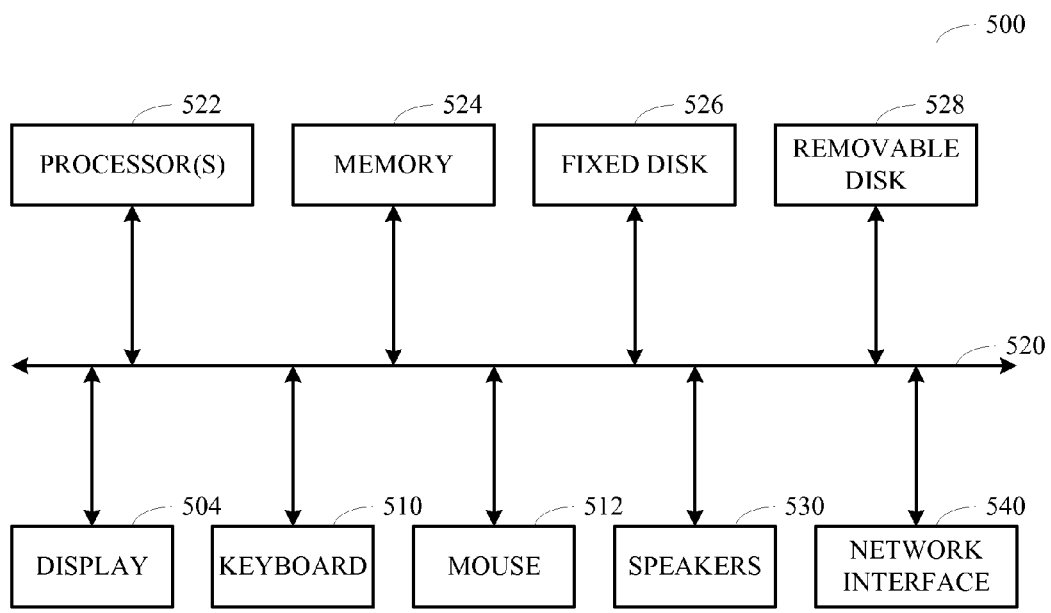

FIGS. 5A and 5B illustrate a computer system 500 suitable for implementing embodiments of the present invention. FIG. 5A shows one possible physical form of the computer system. The computer program instructions implementing the various embodiments of the invention may be executed on such a computer system. Of course, the computer system may have many physical forms including an integrated circuit, a printed circuit board, a small handheld device (such as a mobile telephone or PDA), a personal computer or a super computer.

Computer system 500 includes a monitor 502, a display 504, a housing 506, a disk drive 508, a keyboard 510 and a mouse 512. Disk 514 is a computer-readable medium used to transfer data to and from computer system 500.

FIG. 5B is an example of a block diagram for computer system 500. Attached to system bus 520 are a wide variety of subsystems. Processor(s) 522 (also referred to as central processing units, or CPUs) are coupled to storage devices including memory 524. Memory 524 includes random access memory (RAM) and read-only memory (ROM). As is well known in the art, ROM acts to transfer data and instructions uni-directionally to the CPU, and RAM is used typically to transfer data and instructions in a bi-directional manner. Both of these types of memories may include any suitable of the computer-readable media described below. A fixed disk 526 is also coupled bi-directionally to CPU 522; it provides additional data storage capacity and may also include any of the computer-readable media described below. Fixed disk 526 may be used to store programs, data and the like and is typically a secondary storage medium (such as a hard disk) that is slower than primary storage. It will be appreciated that the information retained within fixed disk 526, may, in appropriate cases, be incorporated in standard fashion as virtual memory in memory 524. Removable disk 528 may take the form of any of the computer-readable media described below.

CPU 522 is also coupled to a variety of input/output devices such as display 504, keyboard 510, mouse 512 and speakers 530. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 522 optionally may be coupled to another computer or telecommunications network using network interface 540. With such a network interface, it is contemplated that the CPU might receive information from the network, or might output information to the network in the course of performing the above-described method steps. Furthermore, method embodiments of the present invention may execute solely upon CPU 522 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

While this invention has been described in terms of several preferred embodiments, there are alterations, permutations, and various substitute equivalents, which fall within the scope of this invention. It should also be noted that there are many alternative ways of implementing the methods and apparatuses of the present invention. For example, although the system and method are described in connection with ranking media content, the same concept may be applied to rank any objects or matters that have various types of relationships among themselves.

In addition, in the embodiment shown in FIG. 2, the weights associated with a user or a piece of media content are calculated based on the relationships directly and immediately connected with the user or the piece of media content, i.e., the first level relationships. However, it is possible to take into consideration subsequent levels of relationships, i.e., relationships further removed, when calculating the weights associated with a particular user or a particular piece of media content. For example, in the relationship graph shown in FIG. 1, node MC 123 is connected with node U 112 by edge R 147. Thus, node MC 123 only has one first level relationship, R 147. However, node U 112 has additional relationships, R 148, R 149, R 150, and R 157 with other nodes MC 122 and MC 127. These relationships are further removed from node MC 123, i.e., second level relationships, and are not directly connected with node MC 123. But since they are directly connected with node U 112, which is directly connected with node MC 123, their weights may also have some influence on the weights of node MC 123, although the influence may not be as strong as the influence asserted by the first level relationship R 147. Generally, the farther a relationship is removed from a node, the less influence its weight has on the weight associated with that node. Nevertheless, it is possible to define different formulas for calculating the weights associated with the nodes, i.e. users and media content, which take into consideration the weights associated with multiple levels of relationships.

It is therefore intended that the following appended claims be interpreted as including all such alterations, permutations, and various substitute equivalents as fall within the true spirit and scope of the present invention.

What is claimed is:

1. A computer-implemented method of ranking a plurality of pieces of media content, wherein each of the plurality of pieces of media content has at least one relationship with at least one of a plurality of users and each of the plurality of users has at least one relationship with at least one of the plurality of pieces of media content, each user and each piece of media content being a node, the plurality of users and the plurality of pieces of media content being a multiplicity of nodes, each node having at least one relationship to at least one other node, wherein each of the plurality of pieces of media content is associated with a weight, each of the plurality of users is associated with a weight, and each relationship is associated with a weight, comprising:

for each node, recursively calculating and updating, in a computer system, the weight associated with the node until a difference between the weights associated with the multiplicity of nodes calculated during a current iteration and the weights associated with the multiplicity of nodes calculated during a previous iteration is less than a predefined threshold, wherein the weight associated with each node is calculated based on the weights of the at least one relationship and the weights of the at least one node with which the node has the at least one relationship; and ranking the plurality of pieces of media content according to their respectively associated weights.

2. A method as recited in claim 1, wherein the weight associated with each node equals $$\sum_{i=1}^{i=n} (W_i(r) * W_i(mc\_u)),$$

wherein n denotes a total number of relationships the node has with other nodes, $W_i(r)$ denotes the weight associated with a relationship, relationship i, which the node has with another node, and $W_i(mc\_u)$ denotes the weight associated with the corresponding other node i having the relationship, relationship i, with the node.

3. A method as recited in claim 1, further comprising:
assigning an initial value to each weight associated with each of the plurality of pieces of media content;
assigning an initial value to each weight associated with each of the plurality of users; and
defining a value to each weight associated with each relationship.

4. A method as recited in claim 1, further comprising:
ranking the plurality of users according to their respectively associated weights.

5. A method as recited in claim 1, wherein each one of the plurality of pieces of media content has at least one relationship with at least another one of the plurality of pieces of media content.

6. A method as recited in claim 1, wherein a relationship between a piece of media content and a user is one selected from the group consisting of the user comments on the piece of media content, the user tags the piece of media content, the user views the piece of media content, the user uploads the piece of media content, the user owns the piece of media content, the user creates the piece of media content, the user considers the piece of media content as favorite, and the user recommends the piece of media content as favorite.

7. A method as recited in claim 1, wherein a relationship between a first user and a second user of the plurality of users is one selected from the group consisting of the first user subscribes to the second user, and the first user considers the second user as a friend.

8. A method as recited in claim 1, wherein a relationship between a first piece of media content and a second piece of media content of the plurality of pieces of media content is one selected from the group consisting of the first piece of media content relates to the second piece of media content, and first piece of media content and the second piece of media content belong to a same program series.

9. A method as recited in claim 1, wherein the difference between the weights associated with the multiplicity of nodes calculated during a current iteration and the weights associated with the multiplicity of nodes calculated during a previous iteration equals $$\left( \sum_{i=1}^{i=n} W_{i,j}(mc\_u) - \sum_{i=1}^{i=n} W_{i,(j-1)}(mc\_u) \right),$$

where n denotes a total number of the multiplicity of nodes, $W_{i,j}(mc\_u)$ denotes the weight associated with a node i during the current iteration, iteration j, and $W_{i,(j-1)}(mc\_u)$ denotes the weight associated with a node i during the previous iteration, iteration j−1.

10. A method as recited in claim 1, wherein the difference between the weights associated with the multiplicity of nodes calculated during a current iteration and the weights associated with the multiplicity of nodes calculated during a previous iteration equals $$\left( \frac{\sum_{i=1}^{i=n} W_{i,j}(mc\_u)}{n} - \frac{\sum_{i=1}^{i=n} W_{i,(j-1)}(mc\_u)}{n} \right),$$

where n denotes a total number of the multiplicity of nodes, $W_{i,j}(mc\_u)$ denotes the weight associated with a node i during the current iteration, iteration j, and $W_{i,(j-1)}(mc\_u)$ denotes the weight associated with a node i during the previous iteration, iteration j−1.

11. A method as recited in claim 1, wherein each of the weights is represented by a numerical value.

12. A method as recited in claim 1, wherein the plurality of users includes a first user and a second user, there being at least two distinct relationships between the first and second users that have different weights and represent different types of relationships between the first and second users.

13. A method as recited in claim 1, wherein the plurality of pieces of media content includes a first piece of media content and a second piece of media content, there being at least two distinct relationships between the first and second pieces of media content that have different weights and represent different types of relationships between the first and second pieces of media content.

14. A method as recited in claim 1, wherein one of the users has at least two distinct relationships with one of the pieces of media content, the at least two distinct relationships having different weights and representing different types of relationships between the one of the users and the one of the pieces of media content.

15. A computer-implemented method of ranking a plurality of pieces of media content for a specific user of a plurality of users, wherein each of the plurality of pieces of media content has at least one relationship with at least one of the plurality of users and each of the plurality of users has at least one relationship with at least one of the plurality of pieces of media content, each user and each piece of media content being a node, the plurality of users and the plurality of pieces of media content being a multiplicity of nodes, each node having at least one relationship with at least one other node, wherein each of the plurality of pieces of media content is associated with a weight, each of the plurality of users is associated with a weight, and each relationship is associated with a weight, comprising:
assigning, in a computer system, an initial value to the weight associated with each of the plurality of pieces of media content, wherein an initial value of a weight associated with a piece of media content is determined based on a content rating associated with the piece of media content obtained for the specific user;
for each of the multiplicity of nodes, recursively calculating and updating the weight associated with the node until the difference between the weights associated with the multiplicity of nodes calculated during a current iteration and the weights associated with the multiplicity of nodes calculated during a previous iteration is less than a predefined threshold, wherein the weight associated with each node is calculated based on the weights of the at least one relationship and the weights of the at least one node with which the node has the at least one relationship; and ranking the plurality of pieces of media content according to their respectively associated weights.

16. A method as recited in claim 15, wherein the weight associated with each node equals $$\sum_{i=1}^{i=n} W(r)_i * W(mc\_u)_i,$$

where n denotes a total number of relationships the node has with other nodes, $W(r)_i$ denotes the weight associated with a relationship the node has with another node, and $W(mc\_u)_i$ denotes the weight associated with the corresponding node having the relationship with the node.

17. A method as recited in claim 15, wherein one of the users has at least two distinct relationships with one of the pieces of media content, the at least two distinct relationships having distinct weights and representing different types of relationships between the one of the users and the one of the pieces of media content.

18. A computer program product for ranking a plurality of pieces of media content, wherein each of the plurality of pieces of media content has at least one relationship with at least one of a plurality of users and each of the plurality of users has at least one relationship with at least one of the plurality of pieces of media content, and wherein each of the plurality of pieces of media content is associated with a weight, each and each piece of media content being a node, the plurality of users and the plurality of pieces of media content being a multiplicity of nodes, each node having at least one relationship with at least one other node, wherein each of the plurality of users is associated with a weight, and each relationship is associated with a weight, the computer program product comprising a computer-readable medium having a plurality of computer program instructions stored therein, which are operable to cause at least one computing device to:

for each node, recursively calculate and update, in a computer system, the weight associated with the node until a difference between the weights associated with the multiplicity of nodes calculated during a current iteration and the weights associated with the multiplicity of nodes calculated during a previous iteration is less than a predefined threshold, wherein the weight associated with each node is calculated based on the weights of the at least one relationship and the weights of the at least one node with which the piece of media content or the user has the at least one relationship; and rank the plurality of pieces of media content according to their respectively associated weights.

19. A computer program product as recited in claim 18, wherein weight associated with each node equals $$\sum_{i=1}^{i=n} (W_i(r) * W_i(mc\_u)),$$

wherein n denotes a total number of relationships the node has with other nodes, $W_i(r)$ denotes the weight associated with a relationship, relationship i, which the node has with another node, and $W_i(mc\_u)$ denotes the weight associated with the corresponding other node i having the relationship, relationship i, with the node.

20. A computer program product as recited in claim 18, wherein the plurality of computer program instructions are further operable to cause the at least one computing device to:

assign an initial value to each weight associated with each of the plurality of pieces of media content;

assign an initial value to each weight associated with each of the plurality of users; and define a value to each weight associated with each relationship.

21. A computer program product as recited in claim 18, wherein a relationship between a piece of media content and a user is one selected from the group consisting of the user comments on the piece of media content, the user tags the piece of media content, the user views the piece of media content, the user uploads the piece of media content, the user owns the piece of media content, the user creates the piece of media content, the user considers the piece of media content as favorite, and the user recommends the piece of media content as favorite, a relationship between a first user and a second user is one selected from the group consisting of the first user subscribes to the second user, and the first user considers the second user as a friend, and a relationship between a first piece of media content and a second piece of media content is one selected from the group consisting of the first piece of media content relates to the second piece of media content, and first piece of media content and the second piece of media content belong to a same program series.

22. A computer program product as recited in claim 18, wherein the difference between the weights associated with the multiplicity of nodes calculated during a current iteration and the weights associated with the multiplicity of nodes calculated during a previous iteration equals $$\left( \sum_{i=1}^{i=n} W_{i,j}(mc\_u) - \sum_{i=1}^{i=n} W_{i,(j-1)}(mc\_u) \right),$$

where n denotes a total number of the multiplicity of nodes, $W_{i,j}(mc\_u)$ denotes the weight associated with node i during the current iteration, iteration j, and $W_{i,(j-1)}(mc\_u)$ denotes the weight associated with node i during the previous iteration, iteration j−1.

23. A computer program product as recited in claim 18, wherein one of the users has at least two distinct relationships with one of the pieces of media content, the at least two distinct relationships having different weights and representing different types of relationships between the one of the users and the one of the pieces of media content.

24. A system for ranking a plurality pieces of media content, wherein each of the plurality of pieces of media content has at least one relationship with at least one of a plurality of users and each of the plurality of users has at least one relationship with at least one of the plurality of pieces of media content, each user and each piece of media content being a node, the plurality of users and the plurality of pieces of media content being a multiplicity of nodes, each node having at least one relationship with at least one other node, wherein each of the plurality of pieces of media content is associated with a weight, each of the plurality of users is associated with a weight, and each relationship is associated with a weight, comprising:
- a relationship graph builder configured to construct and initialize a relationship graph, wherein the relationship graph includes the multiplicity of nodes, relationships among the multiplicity of nodes, predefined weights associated with the relationships, and initial weights associated with the plurality of pieces of media content and the plurality of users, wherein one of the users has at least two distinct relationships with one of the pieces of media content, the at least two distinct relationships having distinct weights and representing different types of relationships between the one of the users and the one of the pieces of media content; and
- a weight calculator configured to calculate the final weights associated with the plurality of pieces of media content and the plurality of users by repeatedly calculating and updating the weights associated with the plurality of pieces of media content and the plurality of users until a difference between the weights calculated during a current iteration and the weights calculated during a previous iteration is less than a predefined threshold.

25. A system as recited in claim 24, further comprising:
at least one database configured to store information with respect to the plurality of users and the plurality of pieces of media content, such that the information is used to construct the relationship graph.

26. A system as recited in claim 25, wherein the at least one database is further configured to store the predefined weights associated with the relationships and the final weights calculated for the plurality of pieces of media content and the plurality of users.

* * * * *